United States Patent
Jin et al.

(10) Patent No.: US 9,920,971 B2
(45) Date of Patent: Mar. 20, 2018

(54) REFRIGERATED TRANSPORT TEMPERATURE REGULATION

(71) Applicant: International Business Machines Corporation, Armonk, NY (US)

(72) Inventors: Feng Jin, Shanghai (CN); Bin Li, Suzhou (CN); Qi Ming Tian, Beijing (CN); Lei Ye, Beijing (CN); Li Zhang, Beijing (CN); Gang Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 14/862,809

(22) Filed: Sep. 23, 2015

(65) Prior Publication Data

US 2017/0082335 A1 Mar. 23, 2017

(51) Int. Cl.
*F25D 25/00* (2006.01)
*G05D 23/32* (2006.01)
(Continued)

(52) U.S. Cl.
CPC ....... *F25D 11/003* (2013.01); *B60H 1/00014* (2013.01); *F25D 29/003* (2013.01);
(Continued)

(58) Field of Classification Search
CPC ............... B60H 1/00014; F25D 11/003; F25D 2700/02; F25D 29/003; H04Q 9/00
(Continued)

(56) References Cited

U.S. PATENT DOCUMENTS 3,638,450 A * 2/1972 Falk .................. B60P 3/205
160/23.1
4,704,876 A * 11/1987 Hill ...................... B60H 1/3232
62/388

(Continued)

FOREIGN PATENT DOCUMENTS

CN 1111342 A 11/1995
EP 2075516 A2 7/2009
(Continued)

OTHER PUBLICATIONS

Estrada-Flores et al., "Thermal performance indicators for refrigerated road vehicles", International Journal of Refrigeration, 29 (2006), Available online Jul. 10, 2006, © 2006 Elsevier Ltd and IIR, pp. 889-898.

(Continued)

*Primary Examiner* — Henry Crenshaw
(74) *Attorney, Agent, or Firm* — Edward J. Wixted, III (57) ABSTRACT

In an approach, a processor predicts a thermal load caused by a door opening event in at least part of a cargo space of a refrigerated transport vehicle based on, at least, an external ambient condition, environmental factors within the cargo space, and a duration of the door opening event. A processor obtains pre-cooling profile information describing cargo space temperature performance with a pre-cooling operation under conditions corresponding to, at least, the predicted thermal load caused by the door opening event. A processor determines a distribution path for the refrigerated transport vehicle based on the predicted thermal load caused by the door opening event and the obtained pre-cooling profile information, wherein the distribution path is associated with the pre-cooling operation.

20 Claims, 6 Drawing Sheets

(51) Int. Cl.
*F25D 23/00* (2006.01)
*F25D 3/12* (2006.01)
*G06F 17/00* (2006.01)
*F25D 11/00* (2006.01)
*B60H 1/00* (2006.01)
*F25D 29/00* (2006.01)
*H04Q 9/00* (2006.01)

(52) U.S. Cl.
CPC ........... *H04Q 9/00* (2013.01); *F25D 2600/06* (2013.01); *F25D 2700/02* (2013.01)

(58) Field of Classification Search
USPC ....... 62/157, 329, 388, 62; 700/275, 299, 90
See application file for complete search history.

(56) References Cited

U.S. PATENT DOCUMENTS

| | | | | |
|---|---|---|---|---|
| 5,161,848 | A * | 11/1992 | Lutton | B60H 1/3232 296/181.6 |
| 8,457,795 | B1 * | 6/2013 | Rubin | G05D 23/1917 700/275 |
| 8,948,920 | B2 | 2/2015 | Lukasse et al. | |
| 2007/0144188 | A1 * | 6/2007 | Kaga | F25D 19/02 62/157 |
| 2007/0225871 | A1 * | 9/2007 | Karstens | G05D 23/1917 700/299 |
| 2008/0195237 | A1 * | 8/2008 | Mukaigawa | F24F 11/0009 700/90 |
| 2012/0000212 | A1 * | 1/2012 | Sanders | F25D 29/003 62/62 |
| 2012/0111044 | A1 | 5/2012 | Chen et al. | |
| 2012/0306646 | A1 * | 12/2012 | Walker | B60R 25/33 340/539.16 |
| 2013/0229172 | A1 * | 9/2013 | Heo | F25D 29/00 324/157 |
| 2014/0098723 | A1 * | 4/2014 | Battista | H04W 4/005 370/311 |
| 2014/0313055 | A1 * | 10/2014 | Warkentin | H04Q 9/00 340/870.16 |
| 2016/0238308 | A1 * | 8/2016 | Uchida | F25D 17/065 |

FOREIGN PATENT DOCUMENTS

| | | |
|---|---|---|
| JP | 4412750 B2 | 2/2010 |
| WO | 2014179013 A1 | 11/2014 |

OTHER PUBLICATIONS

"APL—International container shipping and ocean freight provider", APL, Printed on: Aug 10, 2015,Copyirght © 2015, 2 pages, <http://www.apl.com/wps/portal/apl>.

"Frozen Food Handling and Merchandising", Prepared by the Frozen Food Handling and Merchandising Alliance, McLean, Virginia, Revised 2009, pp. 1-30.

"Good Loading Practices", Carrier Transicold, Provided on Post Disclosure Mar. 10, 2015, pp. 1-36, <http://www.plmtrailer.com/docs/summit-carrier/good-loading-practices.ppt?sfvrsn=2>.

"Innovative packaging from farm to fork", nafispack, Printed on: Aug 10, 2015, 3 pages, <http://www.nafispack.com/objectives.php>.

* cited by examiner

| OUTSIDE AIR TEMPERATURE | CARGO SPACE TEMPERATURE | PRE-COOL TIME TO REACH THE TEMPERATURE LOWER BOUND 4 °C |
|---|---|---|
| 30 °C | 5 °C | > 2000 sec |
| 28 °C | 5 °C | 1667 sec |
| 25 °C | 5 °C | 1196 sec |
| 23 °C | 5 °C | 1095 sec |
| 20 °C | 5 °C | 704 sec |
| 18 °C | 5 °C | 692 sec |
| 15 °C | 5 °C | 581 sec |

REFRIGERATED TRANSPORT TEMPERATURE REGULATION

BACKGROUND

A refrigerated transport is a means of carrying perishable products such fruits, meats, vegetables, dairy products, pharmaceuticals, chemicals and other things that need to be kept in controlled conditions. In a refrigerated transport, products will be contained in a cargo box and the temperature within the cargo box will be kept within a predetermined temperature range to keep the products in a good-quality condition, dependent upon whether the products require a cool or frozen environment. Particularly, in the food industry, the refrigerated transport is an essential link in a food supply chain.

Usually, in refrigerated transport, energy consumption, such as power consumption, is relatively high due to varying ambiences, application types and operating cycles. Thus, energy saving becomes an important problem in many of refrigerated transport applications. Another concern is to maintain temperature integrity for the products, since violations of temperature requirements could cause an undesirable quality loss of products. In refrigerated transport applications, a traditional solution of controlling temperature is a feedback based automation system, in which the air temperature representing a cargo box temperature is measured in real time and fed back to a controller to determine operations of a refrigeration unit, for example switching the refrigeration unit on or off, or adjusting variable frequencies of the refrigeration unit. During a door opening event for product loading or uploading, the traditional feedback based automation system is closed and at that time one or more curtains are usually used, for example, at rear and/or side doors to prevent a sharp increase of temperature during the door opening event. Although this is an easily implemented way for temperature maintenance and can prevent a sharp increase of temperature to a certain degree, it is hard to maintain the temperature integrity for the products since the temperature is still increased unavoidably due to the door opening event.

SUMMARY

Aspects of an embodiment of the present invention disclose a method, computer program product, and computer system. A processor predicts a thermal load caused by a door opening event in at least part of a cargo space of a refrigerated transport vehicle based on, at least, an external ambient condition, environmental factors within the cargo space, and a duration of the door opening event. A processor obtains pre-cooling profile information describing cargo space temperature performance with a pre-cooling operation under conditions corresponding to, at least, the predicted thermal load caused by the door opening event. A processor determines a distribution path for the refrigerated transport vehicle based on the predicted thermal load caused by the door opening event and the obtained pre-cooling profile information, wherein the distribution path is associated with the pre-cooling operation.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
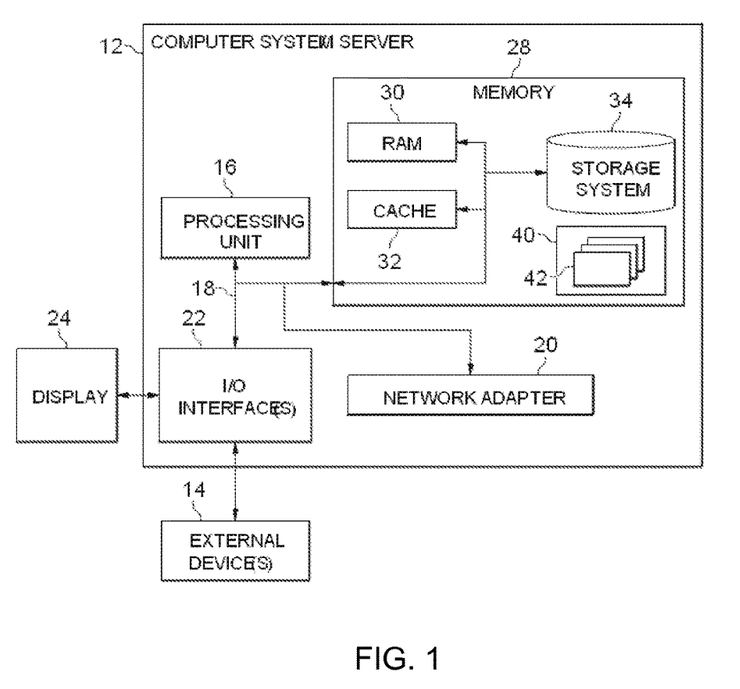
FIG. 1 is a block diagram of a computer system which is applicable to implement an embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As mentioned hereinabove, in a refrigerated transport, curtains are oftentimes used to prevent a sharp increase of temperature of cargo space containing products to be distributed during a door opening event; however, the temperature is still increased due to the door opening events. Thus, in embodiments of the present invention, an improved solution of refrigerated transport temperature regulation is provided, which takes a pre-cooling operation into consideration. Specifically, a door opening load caused by a door opening event is predicted, and at the same time pre-cooling profile information, which describes cargo space temperature performance with a pre-cooling operation under different ambient conditions, is also obtained. Further through taking the pre-cooling operation into consideration based on the predicted door opening load and the obtained pre-cooling profile information, a proposed distribution path is selected for the at least part of the refrigerated transport Thus, during the refrigerated transport, it is possible to perform, in addition to regular temperature control, a temperature regulation for the door opening event. Thus, temperature requirements in the refrigerated transport could be met better. Hereinafter, reference will be made to FIGS. 2 to 9 to describe embodiments of the present invention.

Figure 2:
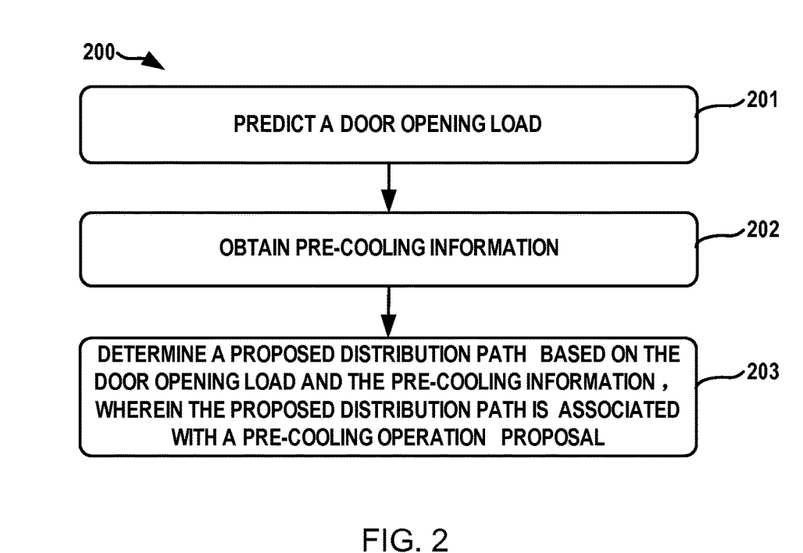
FIG. 2 is a flowchart of a method of refrigerated transport temperature regulation according to an embodiment of the present invention.

FIG. 2 is a flowchart of a method 200 of refrigerated transport temperature regulation according to an embodiment of the present disclosure. This method can be performed in a controller which may be located in respective transport vehicles or in a remote control center of these transport vehicles. The controller can be implemented by a computing device such as the computer system/server 12 as illustrated in FIG. 1, or by any other suitable computing device such a micro-controller, digital signal processor, etc.

In step 201, a door opening load is predicted. Particularly, the door opening load can be predicted based on a predicted ambient condition, a predicted refrigerated condition and duration of the door opening event.

Figure 3A:
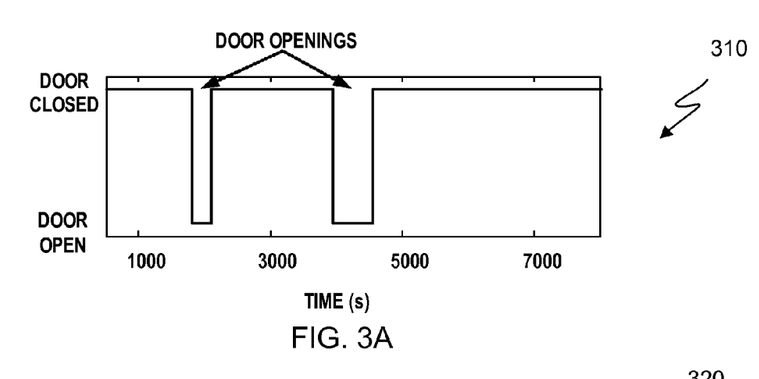
FIG. 3A is a diagram of example door opening events and undesired temperature responses in the door opening events according to an embodiment of the present invention.
Figure 3B:
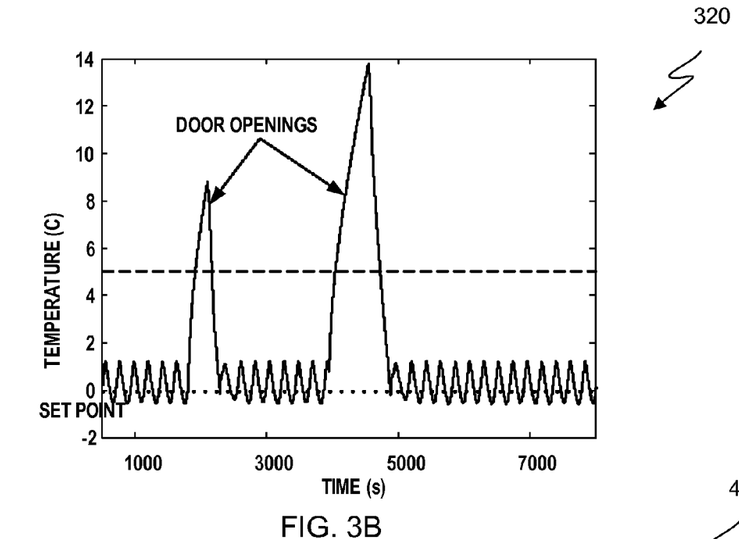
FIG. 3B is a diagram of example door opening events and undesired temperature responses in the door opening events according to an embodiment of the present disclosure.

The term "door opening load" means a thermal load caused by a door opening event. It can be appreciated that during a door opening event, the temperature in a cargo space for containing products to be distributed will be increased due to a heat exchange between the outside ambience and the cool air in the cargo space. This will cause a thermal loss, particularly a cool energy loss. In the meanwhile, from a point view of a refrigeration unit for cooling the cargo space, this thermal loss means a thermal load, which shall be addressed by the refrigeration unit. FIG. 3A illustrates a diagram 310 and FIG. 3B illustrates a diagram 320 of example door opening events and undesired temperature responses in the door opening events according to an embodiment of the present invention. The example door opening events occur at different times and have different durations. From these figures, it is clear that, during the normal refrigerated transport, the temperature changes around a set point (0 degrees Celsius, for example), while during the door opening events, the temperature is increased greatly, which means a thermal loss. For different opening events, the thermal loss is different. This thermal loss caused by a door opening event is a kind of an additional infiltration load for the refrigeration unit and thus is also referred to as the door opening load.

The thermal loss is caused due to the heat exchange between the outside ambience and the cool air in the cargo space and thus, the door opening load is related to the ambient condition, the refrigerated condition, and the duration which the door opening event lasts for.

The term "ambient condition" means a condition in the outside ambience (i.e., the environment outside the cargo box), which may include one or more ambient factors affecting the thermal loss. Examples of the ambient factors may include, but are not limited to, temperature, humidity, environment density, wind speed, and so on. However, the actual ambient condition during the door opening event cannot be obtained until the door opening event actually occurs and thus a predicted value of the ambient condition can be used. In an embodiment of the present disclosure, the predicted ambient condition can be information provided by a specific prediction application like a meteorological prediction application, which could predict the ambient factor (such as the temperature, humidity, environment density, wind speed and the like) in further hours based on current measurements. Thus, if the ambient condition at a certain time point is required, it is possible to obtain the predicted value of the ambient condition directly from the specific prediction application or from a storage device which stores prediction results of ambient condition. In another embodiment of the present invention, the predicted ambient condition can be obtained by performing an ambient condition prediction. For example, the ambient condition in next few hours can be obtained based on the current measurements and history measurement records by means of various prediction methods such as trend extrapolation, exponential smoothing, autoregressive integrated moving average (ARIMA) predictions, moving average method and so on. By this means, it may obtain the predicted ambient condition as well.

Figure 4:
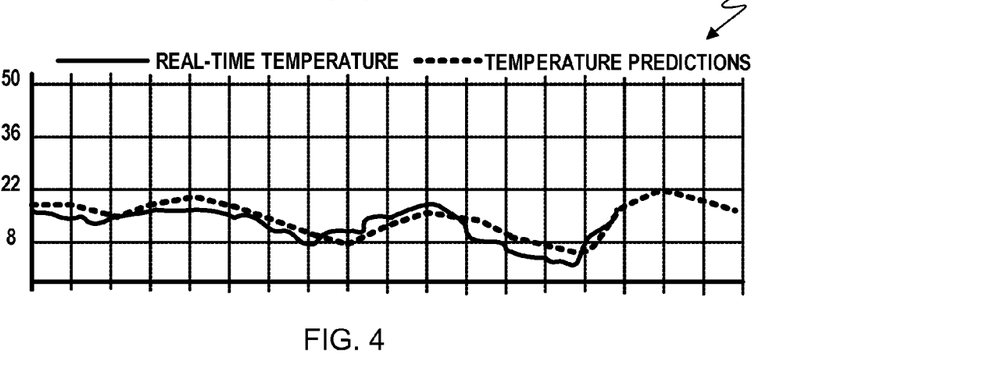
FIG. 4 is a diagram of ambient temperature prediction according to an embodiment of the present invention.

For illustration purposes, FIG. 4 is a diagram 410 of ambient temperature prediction, particularly a diagram of ambient temperature prediction, according to an embodiment of the present invention. In FIG. 4, the solid curve denotes the measured temperature and the dash line denotes the predicted temperature, wherein the ambient temperature prediction is performed by means of one of the above-mentioned prediction algorithms, such as the trend extrapolation. From the Figure, it can be seen that predicted values of the ambient temperature could substantially follow the actual temperature measurements. For other ambient factors such as the humidity, the environment density, the wind speed, and the like, it can obtain similar predicted values by means of similar methods.

The refrigerated condition means environmental factors inside the cargo box could also affect the door opening load. These factors can include, for example, temperature, humidity, environment density, thermal energy and so on. However, different from the ambient condition, the refrigerated condition usually varies within a predetermined range. For example, for a certain product, the temperature will be maintained within a predetermined temperature range. Thus, the medium value, the upper bound or the lower bound of the predetermined temperature range may be roughly taken as the predicted temperature value. For other factors like the humidity, the environment density, and the like, the predicted values can be obtained in a similarly way. The thermal energy is a parameter associated with products. Generally, the thermal energy of a substance at T ° C. indicates a heat quantity required by increasing the temperature of the substance per unit mass from 0° C. to T ° C. Different products usually have different thermal energy and thus the thermal energy herein can be obtained based on the products to be transported.

Based on the predicted ambient condition and the predicted refrigerated condition during the door opening event, it may obtain per unit value for the door opening load, for example, a value for a door opening load per second.

In an embodiment of the present invention, the per unit value for the door opening load may be obtained by for example, a general thermal loss equation as follows:

$$\dot{Q}_{dose} = 0.221 D (h_{amb} - h_z) \rho_z \left(1 - \frac{\rho_{amb}}{\rho_z}\right)^{0.5} (gH)^{0.5} F \quad (1)$$

wherein $\dot{Q}_{door}$ denotes a per unit value for the door opening load caused by a door opening event; D is a constant which represents a thermogenesis coefficient, $h_{amb}$ denotes a humidity outside the cargo box for containing products to be transported; $h_z$ denotes a humidity inside the cargo box; $\rho_{amb}$ denotes an environment density outside the cargo box; $\rho_z$ denotes an environment density inside the cargo box; g denotes the gravitational acceleration; H denotes the thermal energy of products; and F denotes a temperature of the ambient outside the cargo box.

By means of this equation, it may obtain the per unit value for the door opening load. It shall be appreciated that the equation is provided only for illustrative purposes and the present disclosure is not limited thereto. In fact, it is possible to use any other suitable equations to obtain the per unit value for the door opening event. For example, more or less factors can be considered in determining the per unit value.

Further based on the duration of the door opening event, it is possible to determine the door opening loads caused by respective door opening events. The door opening load is a function of the corresponding per unit door opening load and the duration of the door opening event. For example, for certain per unit door opening load, the door opening load and the duration of the door opening event can be in a linear relationship. In such a case, a corresponding door opening load can be predicted by multiplying the per unit load-opening load at the corresponding ambient condition and the refrigerated condition with the time length of the door opening event. Moreover, it can be understood that the door opening load and the duration of the door opening even may also have a nonlinear relationship.

Hereinabove, the description is made to a single door opening event. In a case where there are a plurality of door opening events, the above procedure can be repeated so as to obtain door opening loads for the respective door opening events.

Referring back to FIG. 2, in step 202, the pre-cooling profile information may be obtained. The precooling profile information herein denotes the cargo space temperature performance with pre-cooling operations under different ambient conditions, such as different temperatures, humidities, environment densities, and/or wind speeds. In an embodiment of the present invention, the pre-cooling profile information could be information stored in a storage device, which is obtained in advance by real experiments under various ambient conditions. Alternatively, the pre-cooling profile information may be obtained through a system simulation. For example, a system model can be established based on a real cargo space, operation properties of the refrigeration unit, affection of the ambient condition on the cargo space temperature, and the like. The ambient condition can be, for example, input parameters, and the output may be, for example, changes of the cargo space temperature over time. Thus, different ambient parameters can be input to obtain temperature changes over time with pre-cooling operations under different ambient conditions. It is to be understood that the system model can be built by considering a greater or fewer number of factors or by replacing some factors with other factors.

Figure 5A:
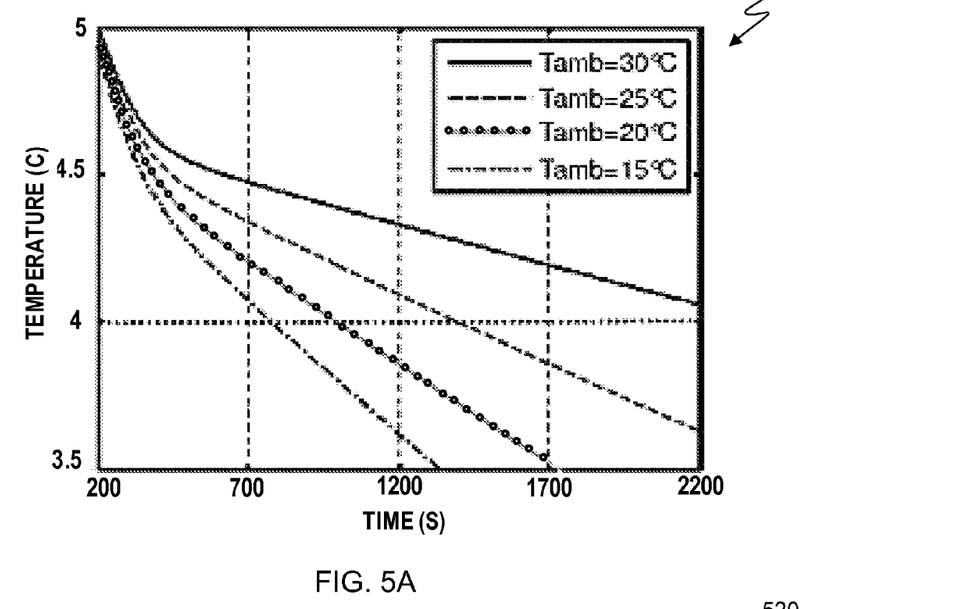
FIG. 5A is a diagram of example pre-cooling profile information according to an embodiment of the present invention.
Figure 5B:
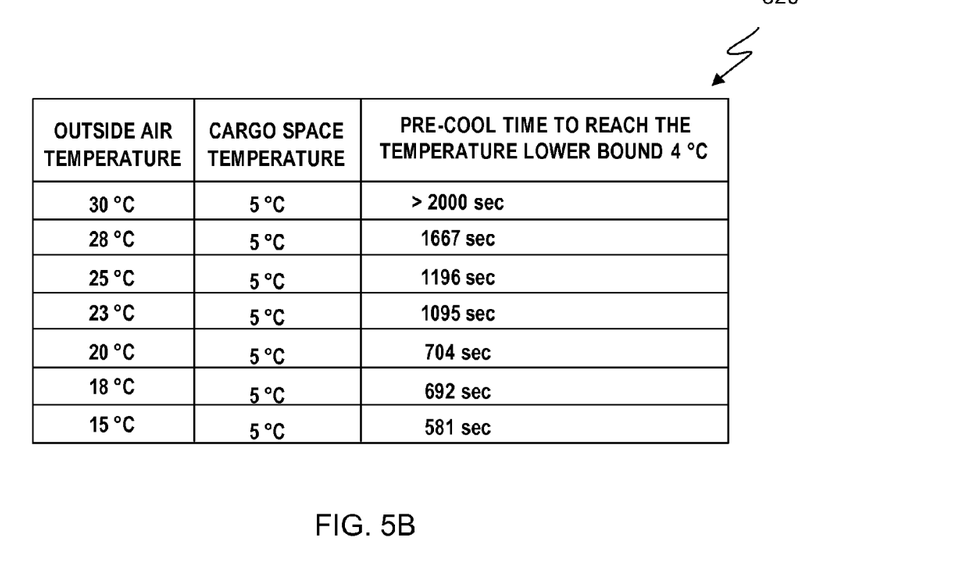
FIG. 5B is a diagram of example pre-cooling profile information according to an embodiment of the present invention.

FIG. 5A illustrates an example 510 of the pre-cooling profile information under a given pre-cooling condition according to an embodiment of the present disclosure, wherein $T_{amb}$ indicates different ambient temperatures. The given pre-cooling condition means a given pre-cooling capability, for example, a given cooling power and/or a given rotation speed of a compressor of the refrigeration unit. As illustrated in FIG. 5A, the pre-cooling profile information shows the temperature changes from the 5° C. to 4° C. under different ambient temperatures. From FIG. 5A, it is clear that for different ambient conditions, the pre-cooling operation results in different cargo temperature performances. As an alternative option, it is possible to use any of other forms to represent the pre-cooling profile information. FIG. 5B illustrates another example of the pre-cooling profile information according to an embodiment of the present disclosure. In FIG. 5B, the pre-cooling profile information is expressed in a form of table 520, which illustrates the time required by the pre-cooling operation if the cargo space is cooled from 5° C. to 4° C. under different ambient temperatures. It is to be understood that the pre-cooling profile information, as illustrated in FIGS. 5A and 5B, are given only for illustrative purposes and the present invention is not limited thereto. In fact, it is possible to use any other forms to represent the pre-cooling profile information or the re-cooling information can be obtained by considering more factors such as humidity, environment density and so on.

In another embodiment of the present disclosure, the pre-cooling profile information may be further obtained by considering thermal capacitance of products to be transported in the refrigerated transport.

In one embodiment, the temperature change of the products in the cargo space, i.e., $$\frac{dT_{product}}{dt},$$

can be expressed as follows:

$$\frac{dT_{product}}{dt} = \frac{\dot{Q}_{product}}{(MC)_{product}} \quad \text{Equation (2)}$$

wherein $\dot{Q}_{product}$ denotes the heat absorbed or dissipated by the product; M in $(MC)_{product}$ denotes the molar mass of the product; C in $(MC)_{product}$ denotes the specific heat capacity of the product.

From the equation (2), it is clear that the temperature change of the products is associated with the thermal capacity of the products, which means that the temperature performance is different for different kinds of products. For example, for the ice creams and strawberries, the temperature performance will be quite different when the pre-cooling operation is performed under the same conditions. Thus, it will be advantageous if the pre-cooling profile information is obtained by considering the thermal capacity of the products since it will help to improve system energy efficiency. In another embodiment of the present disclosure, the obtained pre-cooling profile information could be modified and adjusted based on the thermal capacity of the products so as to consider different performances caused by different kinds of products.

After the door opening load and the pre-cooling profile information are obtained, in step 203, a proposed distribution path can be determined based on the door opening load and the pre-cooling profile information, wherein the proposed distribution path is associated with a pre-cooling operation proposal. The term "distribution path" used herein is a path along which a transport vehicle travels to distribute products and "proposed distribution path" is a distribution path that meets refrigeration requirements with the pre-cooling operation and is selected as a suggested distribution path. The pre-cooling operation proposal is a proposal for a pre-cooling operation with which a proposed distribution path can meet refrigeration requirements. This determination of the proposed distribution path can be implemented by taking the pre-cooling operation into consideration during selecting a distribution path. For example, the determination of proposed distribution path can be performed by using a traditional path searching algorithm while considering the pre-cool operations. The commonly used path searching algorithm may include, but is not limited to, a Dijkstra algorithm, Shortest Path Faster Algorithm (SPFA), Johnson algorithm and any other suitable algorithm.

Figure 6:
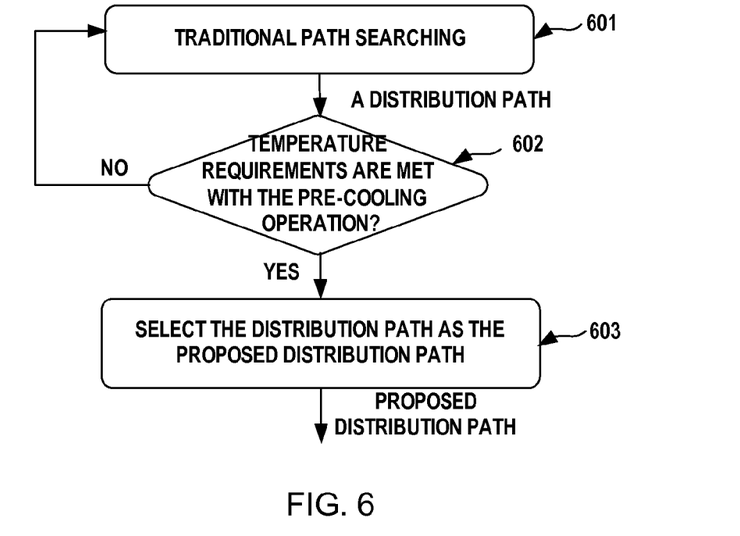
FIG. 6 is a flowchart of a proposed distribution path determination according to an embodiment of the present invention.

FIG. 6 is a flowchart of proposed distribution path determination according to an embodiment of the present invention. As illustrated in FIG. 6, in step 601, an embodiment of the present invention may first perform a distribution path determination by means of for example the Dijkstra algorithm to select the shortest distribution path. Then in decision 602, an embodiment of the present invention may further check whether temperature requirements can be met when the pre-cooling operation is considered before the door opening event. Particularly, an embodiment of the present invention may first determine a required time length of a pre-cooling operation based on the pre-cooling profile information and the predicted door opening load. It is to be understood that the predicted door opening load denotes the cool energy to be supplied by the pre-cooling operation and the pre-cooling profile information denotes the cargo temperature performance under different ambient conditions when the pre-cooling operation is performed. First, by means of the ambient condition when the door opening event is to occur, an embodiment of the present invention can determine a corresponding cargo temperature performance at that ambient condition from the pre-cooling profile information. Then based on the corresponding cargo space temperature performance with the pre-cooling operation and the predicted door opening load (i.e., the cool energy to be supplied by the pre-cooling operation), the required time for the pre-cooling operation can be obtained. If the proposed distribution path cannot meet a requirement on the time length (decision 602, "NO" branch), this distribution path can be abandoned and the method goes back to step 601 and tries another distribution path. If the distribution path meets the requirements on the time length (decision 602, "YES" branch), the method proceeds with step 603, in which this distribution path can be selected as the proposed distribution path.

As an alternative option, it is also possible to check the distribution path through a system simulation. For example, the cargo space temperature change with the pre-cooling operation can be simulated under using the predicted ambient condition, the predicted refrigerated condition, the pre-cooling profile information, the predictive door opening loads and the like, as system parameters of a suitable system module. In the meanwhile, an embodiment of the present invention can set a selection criterion for the proposed distribution path to check whether a distribution path shall be selected as the proposed distribution. If the temperature change for a distribution path meets the selection criterion for the proposed distribution path, the distribution path can be determined as the proposed distribution path; otherwise, the distribution path may be abandoned and another distribution path will be checked.

Figure 7:
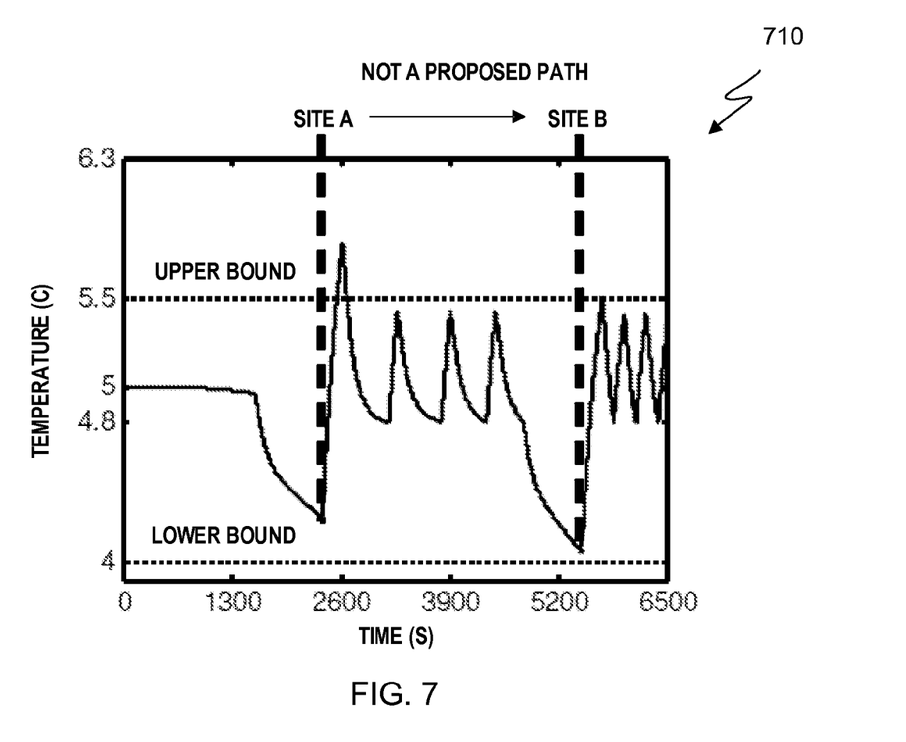
FIG. 7 is a schematic diagram of an example criteria for proposed distribution path determination according to an embodiment of the present invention.

For illustrative purposes, FIG. 7 illustrates an example 710 of criteria for the proposed distribution path determination according to an embodiment of the present invention. As illustrated in FIG. 7, there is set a temperature range with lower and upper bounds, if the simulated cargo space temperature goes beyond either the upper or lower bound as illustrated in FIG. 7, the distribution path will be abandoned; otherwise the distribution path will be determined as the proposed distribution path in step 603.

In an embodiment of the present invention, in selecting the proposed distribution path, the pre-cooling operation can be considered based on the thermal capacity of product to be transported. As described hereinbefore, for different kinds of products, the cargo space temperature performance is different and thus it will take different time to achieve a desired temperature. Thus the pre-cooling profile information may be obtained through considering the capacity of the product and, in such a case, the cargo space temperature performance corresponding to the ambient condition and the thermal capacity of product can be selected from the pre-cooling profile information. Therefore, the duration of the pre-cooling operation can be determined from the cargo space temperature performance selected based on the thermal capacity of the product and accordingly, the system energy efficiency may be further improved.

In such a way, it is possible to obtain a proposed distribution path, which could meet temperature requirements in the refrigerated transport. In fact, in a case where there are a plurality of distribution paths which could meet temperature requirements, one of the distribution path which could further achieve the optimal energy efficiency can be determined as the proposed distribution path. Thus, during the refrigerated transport, the product distribution can be conducted along the proposed distribution path and with pre-cooling operation proposal associated with the proposed path.

As described hereinabove, in selecting the distribution path, pre-cooling operations are considered, particularly the time length of the pre-cooling operations are determined. This means the proposed distribution path are associated with specific pre-cooling operations. The Information on the pre-cooling operations associated with the proposed distribution path will be used to perform the pre-cooling operations in the refrigerated transport. Detailed description of the pre-cooling operation will be made with reference to FIG. 8, which is a flowchart of refrigerated transport temperature control implemented during the refrigerated transport according to an embodiment of the present disclosure.

Figure 8:
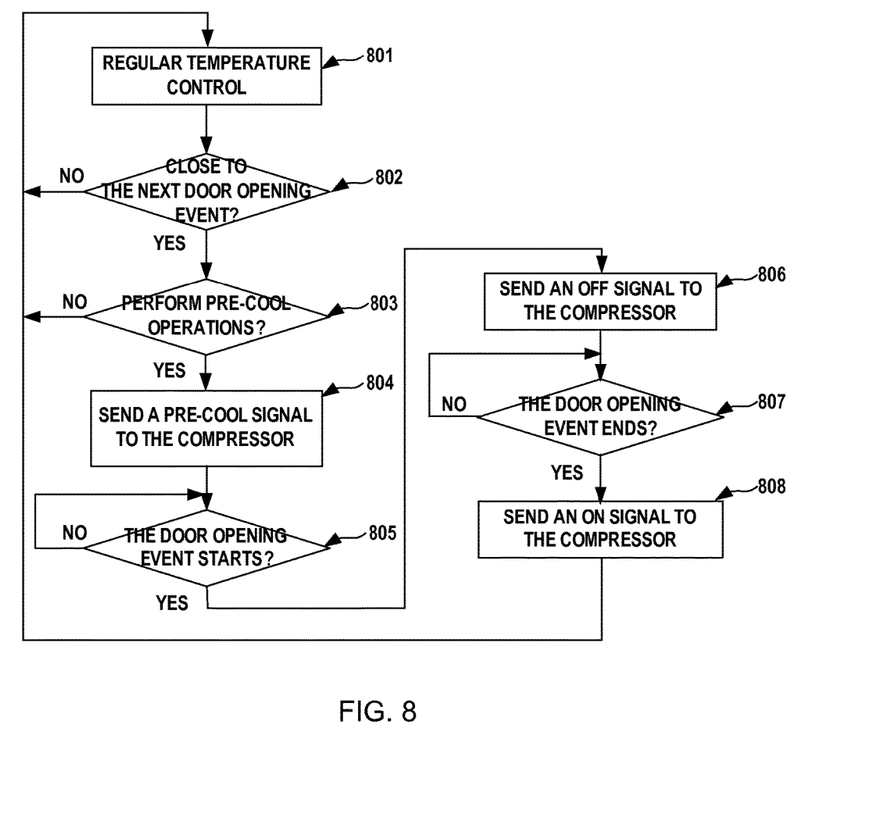
FIG. 8 is a flowchart of refrigerated transport temperature control implemented during the refrigerated transport according to an embodiment of the present invention.

As illustrated in FIG. 8, the regular temperature control is performed in step 801. The regular temperature control may be a baseline hysteretic temperature control to maintain the temperature inside the cargo space in a predetermined range. The temperature control may be for example a Proportion Integration Differentiation (PID) control, or use any other suitable control strategies. In decision 802, an embodiment of the present invention determines whether the next door opening event is to occur soon. For example, an embodiment of the present invention may determine whether there is a predetermined time length before an upcoming door open event. The predetermined time length may be a value ranging from, for example, 5 to 10 minutes. If it is not close to the upcoming door opening event (decision 802, "NO" branch), the method goes back to step 801 and continues the regular temperature control. On the other hand, if it is close to the next door opening event (decision 802, "YES" branch), an embodiment of the present invention determines whether the pre-cooling operations shall be performed in step 803. As mentioned hereinabove, for the proposed distribution path, there are pre-cooling operations associated therewith. Thus, before each of the door opening events, an embodiment of the present invention will perform the associated pre-cooling operation for a predetermined time length. Particularly, in decision 803, an embodiment of the present invention determines whether it is time to start the pre-cooling operation based on the information on the pre-cooling operation associated with the door opening event. For example, if the information on the pre-cooling operation associated with the door opening event shows that the pre-cooling operation shall last for 4 minutes, an embodiment of the present invention will determine, in decision 803, whether there is only 4 minutes left before the door is to be opened. If an embodiment of the present invention determines that there is not time to start the pre-cooling operation (decision 803, "NO" branch), then the method continues to step 801. If an embodiment of the present invention determines that there is time to start the pre-cooling operation (decision 803, "YES" branch), then in step 804, an embodiment of the present invention may send a pre-cool signal to the refrigeration unit so that a compressor of the refrigeration unit can run at a high speed to pre-cool the cargo space. In decision 805, an embodiment of the present invention determines whether the door opening event starts, or in other word, whether the door is opened. If an embodiment of the present invention determines that the door opening event has not started, (decision 805, "NO" branch), the method continues the determination, for example, after several seconds; otherwise (decision 805, "YES" branch), the method proceeds to step 806, in which an OFF signal is sent to the compressor to turn the refrigeration unit off. Afterwards, in decision 807, an embodiment of the present invention waits until the door opening event ends. If the door opening event ends (decision 807, "YES" branch), a pre-cooling signal is sent to the refrigeration unit to turn on the compressor (step 808) and the method goes back to step 801 and continues the regular temperature control. In such a way, the refrigerated transport temperature can be controlled by performing the pre-cooling operations so as to provide complementary temperature regulation for the refrigerated transport.

However, it is to be understood that the operations described with reference to FIG. 8 are given only for illustrative purposes and the present disclosure is not limited thereto. For example, step 802 can be omitted, and/or the sending of OFF signal in step 806 can be triggered by the expiration of the duration of the pre-cooling operation instead of the door opening event, or by any of them.

In addition to the method described with reference to FIGS. 2 to 8, there is also provided a system of refrigerated transport temperature regulation in the present disclosure. The system, comprise one or more processors; a memory coupled to at least one of the processors; a set of program instructions stored in the memory and executable by at least one of the processors to cause the system to preform operations of a method described with reference to FIGS. 2 to 8. For simplification purposes, detailed description will be omitted and for details about these operations, reference can be made description regarding FIGS. 2 to 8.

In addition, a system of refrigerated transport temperature regulation in the present disclosure is further provided, which will be described with reference to FIG. 9. The system 900 can be performed in or as a controller which may be located in a respective transport vehicle or in a remote control center of the transport vehicle. The controller can be implemented by a computing device such as the computer system/server 12 as illustrated in FIG. 1, or by any other suitable computing device such a micro-controller, digital signal processor, etc.

Figure 9:
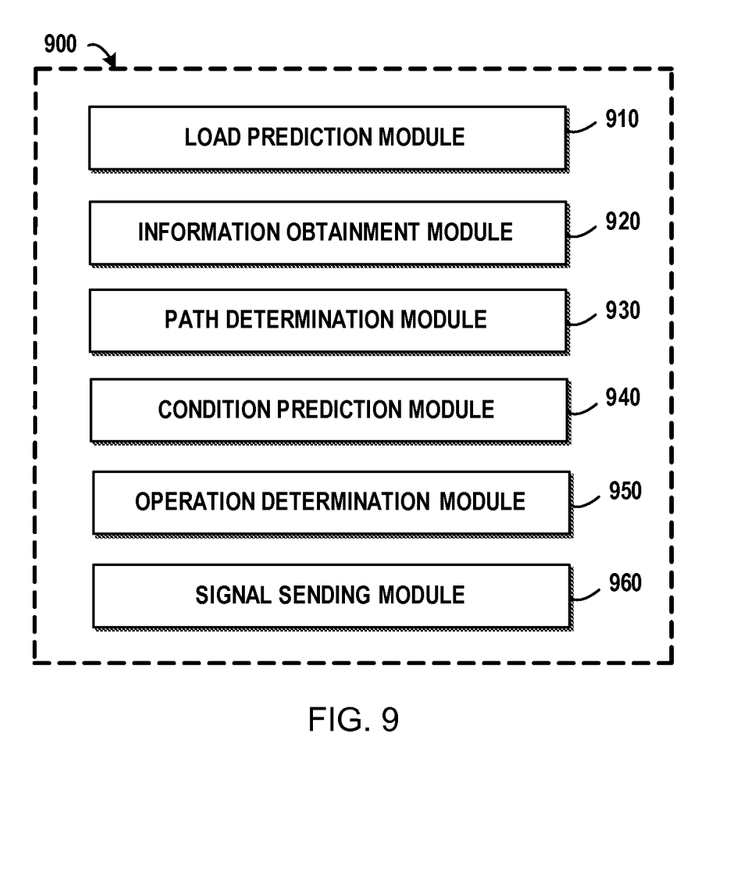
FIG. 9 is a block diagram of a system of refrigerated transport temperature regulation according to an embodiment of the present invention.

Reference is made to FIG. 9, which is a block diagram of a system of refrigerated transport temperature regulation according to an embodiment of the present disclosure.

In the embodiment as shown in FIG. 9, the system 900 includes a load prediction module 910, an information obtainment module 920, a path determination module 930, a condition prediction module 940, an operation determination module 950, and a signal sending module 960. The load prediction module 910 may be configured to predict a door opening load caused by a door opening event in at least part of a refrigerated transport based on a predicted ambient condition, a predicted refrigerated condition and duration of the door opening event. The information obtainment module 920 may be configured to obtain pre-cooling profile information describing cargo space temperature performance with a pre-cooling operation under different ambient conditions. The path determination module 930 may be configured to select a proposed distribution path for the at least part of the refrigerated transport by taking the pre-cooling operation into consideration based on the predicted door opening load and the obtained pre-cooling profile information to perform temperature regulation for the door opening event.

In an embodiment of the present disclosure, the path determination module 930 may be further configured to determine the proposed distribution path as a distribution path which could meet temperature requirements in the refrigerated transport. In an alternative embodiment of the present disclosure, the path determination module 930 may be further configured to determine the proposed distribution path as a distribution path which could further achieve an optimal energy efficiency.

In another embodiment of the present disclosure, the path determination module 930 may be configured to taking the pre-cooling operation into consideration further based on thermal capacitance of products to be transported in the refrigerated transport. In such a way, the system energy efficiency can be further improved.

In a further embodiment of the present disclosure, the system 900 may further optionally comprise a condition prediction module 940, configured to predict an ambient condition during the at least part of the refrigerated transport so as to obtain the predicted ambient condition.

In a still further embodiment of the present disclosure, the pre-cooling profile information may be obtained through a system simulation.

In another embodiment of the present disclosure, the system 900 may further optionally comprise: an operation determination unit 950 and a signal sending module 960. The operation determination unit 950 may be configured to determine whether it is to perform a pre-cooling operation based on information on the pre-cooling operation associated with the proposed distribute path. The signal sending module 960 may be configured to send a pre-cooling control signal to a refrigeration unit used for cooling a cargo space in response to the determining that it is to perform the pre-cooling operation.

In another embodiment of the present disclosure, the operation determination unit 950 is optionally configured to operate when it is close to a next door opening event.

In a further embodiment of the present disclosure, the system 900 may be operated again in at least one case of the predicted ambient condition being updated and an actual distribution path in the refrigerated transport being changed.

It is to be understood that the modules shown in FIG. 9 can be implemented by various manners, including software, hardware, firmware or a random combination thereof. For example, in some embodiments, one or more modules can be implemented by software and/or firmware. Alternatively or additionally, the system 900 can be implemented partially or completely based on hardware. For example, one or more modules in the system 900 can be implemented as an integrated circuit (IC) chip, an application-specific integrated circuit (ASIC), a system on chip (SOC), a field programmable gate array (FPGA), and the like.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, the method comprising:
    predicting, by one or more processors, a thermal load caused by a door opening event in at least part of a cargo space of a refrigerated transport vehicle based on, at least, an external ambient condition, environmental factors within the cargo space, and a duration of the door opening event;
    obtaining, by one or more processors, pre-cooling profile information describing cargo space temperature performance with a pre-cooling operation under conditions corresponding to, at least, the predicted thermal load caused by the door opening event; and
    determining, by one or more processors, a distribution path for the refrigerated transport vehicle based on the predicted thermal load caused by the door opening event and the obtained pre-cooling profile information, wherein the distribution path is associated with the pre-cooling operation.

2. The method of claim 1, wherein the distribution path meets temperature requirements associated with cargo of the cargo space.

3. The method of claim 1, wherein the pre-cooling operation is further based on thermal capacitance of one or more products located within the cargo space.

4. The method of claim 1, wherein the external ambient condition includes, at least, temperature, humidity, and wind speed.

5. The method of claim 1, wherein the pre-cooling profile information is based on, at least, a simulation of temperature changes with the pre-cooling operation under conditions corresponding to, at least the predicted thermal load caused by the door opening event.

6. The method of claim 1, further comprising:
    determining, by one or more processors, to perform the pre-cooling operation based on the pre-cooling profile information; and
    causing, by one or more processors, a refrigeration unit, of the refrigerated transport vehicle, to cool the cargo space based on the pre-cooling operation.

7. The method of claim 6, wherein determining to perform the pre-cooling operation is further based on a predetermined time before occurrence of the door opening event.

8. A computer program product, the computer program product comprising:
    one or more computer readable storage media and program instructions stored on the one or more computer readable storage media, the program instructions comprising:
    program instructions to predict a thermal load caused by a door opening event in at least part of a cargo space of a refrigerated transport vehicle based on, at least, an external ambient condition, environmental factors within the cargo space, and a duration of the door opening event;
    program instructions to obtain pre-cooling profile information describing cargo space temperature performance with a pre-cooling operation under conditions corresponding to, at least, the predicted thermal load caused by the door opening event; and program instructions to determine a distribution path for the refrigerated transport vehicle based on the predicted thermal load caused by the door opening event and the obtained pre-cooling profile information, wherein the distribution path is associated with the pre-cooling operation.

9. The computer program product of claim 8, wherein the distribution path meets temperature requirements associated with cargo of the cargo space.

10. The computer program product of claim 8, wherein the pre-cooling operation is further based on thermal capacitance of one or more products located within the cargo space.

11. The computer program product of claim 8, wherein the external ambient condition includes, at least, temperature, humidity, and wind speed.

12. The computer program product of claim 8, wherein the pre-cooling profile information is based on, at least, a simulation of temperature changes with the pre-cooling operation under conditions corresponding to, at least the predicted thermal load caused by the door opening event.

13. The computer program product of claim 8, further comprising:

program instructions, stored on the one or more computer readable storage media, to determine to perform the pre-cooling operation based on the pre-cooling profile information; and program instructions, stored on the one or more computer readable storage media, to cause a refrigeration unit, of the refrigerated transport vehicle, to cool the cargo space based on the pre-cooling operation.

14. The computer program product of claim 13, wherein the program instructions to determine to perform the pre-cooling operation is further based on a predetermined time before occurrence of the door opening event.

15. A computer system, the computer system comprising:
one or more computer processors, one or more computer readable storage media, and program instructions stored on the computer readable storage media for execution by at least one of the one or more processors, the program instructions comprising:

program instructions to predict a thermal load caused by a door opening event in at least part of a cargo space of a refrigerated transport vehicle based on, at least, an external ambient condition, environmental factors within the cargo space, and a duration of the door opening event;

program instructions to obtain pre-cooling profile information describing cargo space temperature performance with a pre-cooling operation under conditions corresponding to, at least, the predicted thermal load caused by the door opening event; and program instructions to determine a distribution path for the refrigerated transport vehicle based on the predicted thermal load caused by the door opening event and the obtained pre-cooling profile information, wherein the distribution path is associated with the pre-cooling operation.

16. The computer system of claim 15, wherein the distribution path meets temperature requirements associated with cargo of the cargo space.

17. The computer system of claim 15, wherein the pre-cooling operation is further based on thermal capacitance of one or more products located within the cargo space.

18. The computer system of claim 15, wherein the external ambient condition includes, at least, temperature, humidity, and wind speed.

19. The computer system of claim 15, wherein the pre-cooling profile information is based on, at least, a simulation of temperature changes with the pre-cooling operation under conditions corresponding to, at least the predicted thermal load caused by the door opening event.

20. The computer system of claim 15, further comprising:
program instructions, stored on the one or more computer readable storage media for execution by at least one of the one or more processors, to determine to perform the pre-cooling operation based on the pre-cooling profile information; and program instructions, stored on the one or more computer readable storage media for execution by at least one of the one or more processors, to cause a refrigeration unit, of the refrigerated transport vehicle, to cool the cargo space based on the pre-cooling operation.

* * * * *